US010905989B2

(12) United States Patent
Chandra et al.

(10) Patent No.: US 10,905,989 B2
(45) Date of Patent: Feb. 2, 2021

(54) ELECTROMAGNET INTERFACE FOR A WATER FILTER ASSEMBLY

(71) Applicant: Haier US Appliance Solutions, Inc., Wilmington, DE (US)

(72) Inventors: Sharath Chandra, Hyderabad (IN); Naresh Suthar, Hyderabad (IN); Gregory Sergeevich Chernov, Louisville, KY (US); Koncha Chandra Sekhar, Hyderabad (IN); Allamneni Naga Tejaswini, Hyderabad (IN); Syed Moin Ahmed, Hyderabad (IN)

(73) Assignee: Haier US Appliance Solutions, Inc., Wilmington, DE (US)

( * ) Notice: Subject to any disclaimer, the term of this patent is extended or adjusted under 35 U.S.C. 154(b) by 339 days.

(21) Appl. No.: 15/980,904

(22) Filed: May 16, 2018

(65) Prior Publication Data

US 2019/0351353 A1 Nov. 21, 2019

(51) Int. Cl.
| | | |
|---|---|---|
| *B01D 35/30* | (2006.01) | |
| *B01D 29/15* | (2006.01) | |
| *F25D 23/12* | (2006.01) | |
| B01D 35/02 | (2006.01) | |
| B01D 29/11 | (2006.01) | |

(52) U.S. Cl.
CPC .......... *B01D 35/306* (2013.01); *B01D 29/15* (2013.01); *F25D 23/126* (2013.01); *B01D 2201/30* (2013.01); *B01D 2201/4069* (2013.01); *F25D 2323/121* (2013.01)

(58) Field of Classification Search
CPC .. B01D 35/306; B01D 29/15; B01D 2201/30; B01D 2201/4069; B01D 2201/4023; B01D 2201/302; B01D 35/02; B01D 2201/295; B01D 29/114; F25D 23/126; F25D 2323/121; F25D 2317/00; F25D 17/02

See application file for complete search history.

(56) References Cited

U.S. PATENT DOCUMENTS

| | | | |
|---|---|---|---|
| 6,632,355 | B2 | 10/2003 | Fritze |
| 7,506,666 | B2 | 3/2009 | Tubby et al. |
| 7,836,708 | B2 | 11/2010 | Krause et al. |
| 8,177,973 | B2 | 5/2012 | Kennedy et al. |
| 8,182,699 | B2 | 5/2012 | Fritze |

(Continued)

FOREIGN PATENT DOCUMENTS

| | | |
|---|---|---|
| CN | 202212062 U | 5/2012 |
| CN | 203790657 U | 8/2014 |

(Continued)

OTHER PUBLICATIONS

AWQInc, Directions for Changing Cartridge Filters, 2015, Wayback Machine capture (Year: 2015).*

(Continued)

*Primary Examiner* — Bradley R Spies
*Assistant Examiner* — Jeannie McDermott
(74) *Attorney, Agent, or Firm* — Dority & Manning, P.A.

(57) ABSTRACT

A water filter assembly is provided that includes features that facilitate mounting and removal of a water filter cartridge to and from a manifold. In particular, the water filter assembly includes an electromagnet interface that simplifies and aids mounting of the water filter cartridge to the manifold as well as removal from the manifold.

20 Claims, 14 Drawing Sheets

(56) References Cited

U.S. PATENT DOCUMENTS

| | | | |
|---|---|---|---|
| 9,011,686 B2 | 4/2015 | Kirchner et al. | |
| 2004/0069028 A1* | 4/2004 | Dimig | E05B 83/36 70/277 |
| 2005/0173323 A1* | 8/2005 | Meuleners | F25D 23/126 210/184 |
| 2010/0018912 A1* | 1/2010 | Wawrla | C02F 9/005 210/101 |
| 2018/0030645 A1* | 2/2018 | Kulkarni | D06F 58/22 |

FOREIGN PATENT DOCUMENTS

| | | | | |
|---|---|---|---|---|
| GB | 2452523 A | * | 3/2009 | H01R 33/94 |
| KR | 20000074968 A | | 12/2000 | |

OTHER PUBLICATIONS

Wutke, Susan, Why you should change your refrigerator's water filter every six months, 2017m Wayback machine capture (Year: 2017).*

* cited by examiner

ELECTROMAGNET INTERFACE FOR A WATER FILTER ASSEMBLY

FIELD OF THE INVENTION

The present subject matter relates generally to water filter assemblies, such as water filter assemblies for refrigerator appliances.

BACKGROUND OF THE INVENTION

Water filters are generally divided into two classes: point of entry water filters and point of use water filters. Point of use water filters can be installed at a kitchen sink or within a refrigerator appliance in order to filter water entering such devices. In order to filter water, water filters are generally provided with a filter media, such as an activated carbon block. The water filter's filter media can adsorb or remove contaminants such as chlorine and lead from water prior to delivering such water to a user. For example, the water filter can filter water prior to such water entering the refrigerator's ice maker or water dispenser.

The activated carbon block has pores that permit a flow of water therethrough. By passing through the pores, contaminants such as sand, rust, and cysts within the flow of water can be mechanically filtered out of the water. Similarly, volatile organic compounds such as chloroform, lindane, and atrazine can be adsorbed into pore surfaces as water moves through the carbon block. However, the filtering capacity of the filtering media can decrease over time due to pores becoming clogged or pore surfaces become saturated with contaminates. Also, conditions within the filtering media can provide for large scale bacteria growth, particularly over time. For example, bacteria can start to grow within the carbon block given the right water conditions and sufficient time.

To hinder such bacteria growth and insure that the filter media has not exceeded its filtering capacity, the water filter is preferably replaced or serviced about every six months regardless of its current performance. Removing and installing water filters can be messy and time consuming tasks. For example, when the water filter is removed from a manifold, the water filter is typically filled with water and such water can spill if the water filter is tipped or tilted during removal. However, tipping or tilting certain water filters can be required in order to remove certain water filters due to their location. Such spills can be time consuming and inconvenient to clean. Further, some conventional water filters require a user to twist or rotate the water filter to install or remove the water filter from the manifold. Twisting or rotating may be challenging for some users, particularly, when the water filter is filled with water. Thus, certain consumers only replace their water filters long after the useful service life of their filters.

Accordingly, a water filter assembly that addresses one or more of the challenges noted above would be useful.

BRIEF DESCRIPTION OF THE INVENTION

Aspects and advantages of the invention will be set forth in part in the following description, or may be apparent from the description, or may be learned through practice of the invention.

In one exemplary embodiment, a water filter assembly is provided. The water filter assembly includes a manifold defining a groove extending between a first end and a second end, the manifold further defining a slit in communication with the groove. The water filter assembly also includes a magnet disposed within the groove at the first end. Further, the water filter assembly includes a conducting coil disposed within the groove at the second end, the conducting coil in electrical communication with a power supply. In addition, the water filter assembly includes a magnetic plunger slideably received within the groove and movable between a first position and a second position. Moreover, the water filter assembly includes a filter cartridge removably mounted to the manifold, the filter cartridge comprising a housing that defines a chamber and a securing member projecting from the housing and defining an opening. The water filter assembly also includes a filter media disposed within the chamber. When the magnetic plunger is in the first position and the filter cartridge is mounted to the manifold, the securing member is received within the slit, the magnetic plunger is received by the opening of the securing member, the conducting coil surrounds at least a portion of the magnetic plunger, and the magnetic plunger is attracted to the magnet.

In another exemplary embodiment, a method for removing a filter cartridge from a manifold is provided. The filter cartridge comprises a securing member defining an opening. The manifold defines a groove extending between a first end and a second end and a slit in communication with the groove and configured to receive the securing member. The manifold comprises a magnetic plunger received within the groove and movable between a first position and a second position. The manifold further comprises a magnet disposed at the first end of the groove and a conducting coil disposed between the slit and the second end of the groove, the conducting coil in electrical communication with a power supply. When the magnetic plunger is in the first position and the filter cartridge is mounted to the manifold, the magnetic plunger is attracted to the magnet and the magnetic plunger is received by the opening of the securing member. The method includes shutting off a flow of water to the manifold. Further, the method includes inducing a magnetic field to move the magnetic plunger from the first position to the second position such that the magnetic plunger is repelled from the magnet and the magnetic plunger is no longer received within the opening of the securing member.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
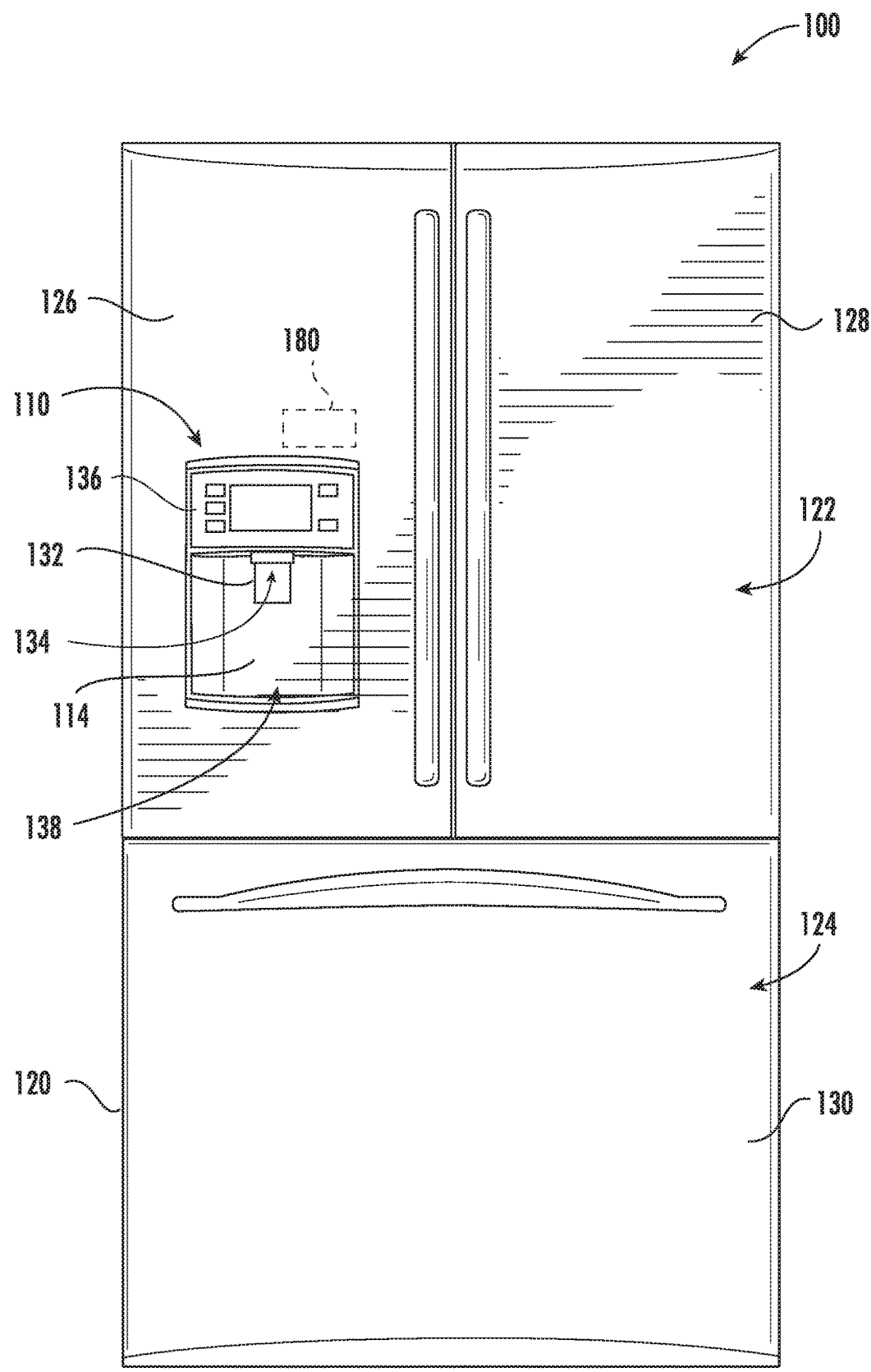
FIG. 1 provides a front, elevation view of a refrigerator appliance according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a front view of an exemplary embodiment of a refrigerator appliance 100. Refrigerator appliance 100 includes a cabinet or housing 120 defining an upper fresh food chamber 122 and a lower freezer chamber 124 arranged below the fresh food chamber 122. As such, refrigerator appliance 100 is generally referred to as a bottom mount refrigerator. In the exemplary embodiment, housing 120 also defines a mechanical compartment (not shown) for receipt of a sealed cooling system. Using the teachings disclosed herein, it will be understand that the present subject matter can be used with other types of refrigerators (e.g., side-by-sides top mount). Thus, the description set forth herein is provided by way of example only and is not intended to limit the present subject matter to any particular arrangement or placement within an appliance.

Refrigerator doors 126, 128 are rotatably hinged to an edge of housing 120 for accessing fresh food compartment 122. A freezer door 130 is arranged below refrigerator doors 126, 128 for accessing freezer chamber 124. In the exemplary embodiment, freezer door 130 is coupled to a freezer drawer (not shown) slidably mounted within freezer chamber 124.

Refrigerator appliance 100 includes a dispensing assembly 110 for dispensing water and/or ice. Dispensing assembly 110 includes a dispenser 114 positioned on an exterior portion of refrigerator appliance 100. Dispenser 114 includes a discharging outlet 134 for accessing ice and water. An activation member 132 is mounted below discharging outlet 134 for operating dispenser 114. In FIG. 1, activation member 132 is shown as a paddle. However, activation member 132 may be any other suitable mechanism for signaling or initiating a flow of ice and/or water into a container within dispenser 114, e.g., a switch or button. A user interface panel 136 is provided for controlling the mode of operation. For example, user interface panel 136 includes a water dispensing button (not labeled) and an ice-dispensing button (not labeled) for selecting a desired mode of operation such as crushed or non-crushed ice.

Discharging outlet 134 and activation member 132 are an external part of dispenser 114, and are mounted in a recessed portion 138 defined in an outside surface of refrigerator door 126. Recessed portion 138 is positioned at a predetermined elevation convenient for a user to access ice or water and enabling the user to access ice without the need to bend-over and without the need to access freezer chamber 124. In the exemplary embodiment, recessed portion 138 is positioned at a level that approximates the chest level of a user.

Figure 2:
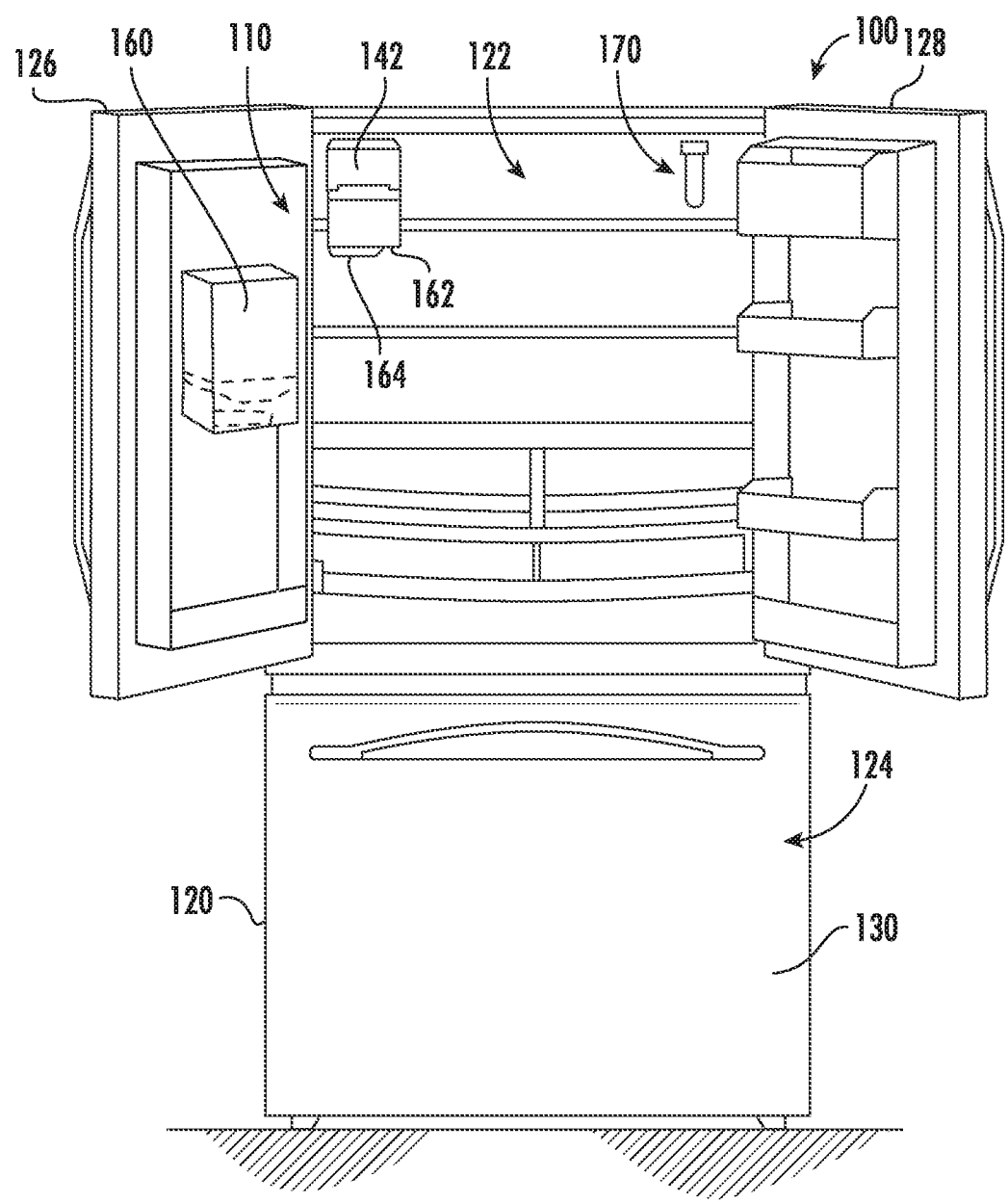
FIG. 2 provides a front, elevation view of the refrigerator appliance of FIG. 1 with refrigerator doors of the refrigerator appliance shown in an open configuration to reveal a fresh food chamber of the refrigerator appliance.

FIG. 2 provides a front perspective view of refrigerator appliance 100 having refrigerator doors 126, 128 in an open position to reveal the interior of fresh food chamber 122. As such, certain components of dispensing assembly 110 are illustrated. Dispensing assembly 110 includes an insulated housing 142 mounted within refrigerator chamber 122. Due to insulation surrounding insulated housing 142, the temperature within insulated housing 142 can be maintained at levels different from the ambient temperature in the surrounding fresh food chamber 122.

In particular, insulated housing 142 is constructed and arranged to operate at a temperature that facilitates producing and storing ice. More particularly, insulated housing 142 contains an ice maker for creating ice and feeding the same to a receptacle 160 that is mounted on refrigerator door 126. As illustrated in FIG. 2, receptacle 160 is placed at a vertical position on refrigerator door 126 that will allow for the receipt of ice from a discharge opening 162 located along a bottom edge 164 of insulated housing 142 when refrigerator door 126 is in a closed position (shown in FIG. 1). As door 126 is closed or opened, receptacle 160 is moved in and out of position under insulated housing 142.

In an alternative exemplary embodiment, insulated housing 142 and its ice maker can be positioned directly on door 126. In still another exemplary embodiment, the ice maker could be located on the door for the freezer compartment and directly over receptacle 160, e.g., in a configuration where the fresh food compartment and the freezer compartment are located side by side (as opposed to over and under as shown in FIGS. 1 and 2). As such, the use of an insulated housing would be unnecessary. Other configurations for the location of receptacle 160, an ice maker, and/or insulated housing 142 may be used as well.

Referring again to FIG. 1, operation of the refrigerator appliance 100 is regulated by a controller 180 that is operatively coupled to user interface panel 136 and/or activation member 132. Panel 136 provides input selectors for user manipulation of the operation of refrigerator appliance 100 such as e.g., selections between whole or crushed ice, chilled water, and/or other options as well. In response to user manipulation of the user interface panel 136, the controller 180 operates various components of the refrigerator appliance 100. The controller 180 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor.

The controller 180 may be positioned in a variety of locations throughout refrigerator appliance 100. For example, the controller 180 may be located beneath the user interface panel 136 on door 126. Alternatively, as shown in FIG. 1, controller 180 may be positioned proximate user interface panel 136 on door 126. In some embodiments, input/output ("I/O") signals may be routed between the controller 180 and various operational components of refrigerator appliance 100. In some exemplary embodiments, the user interface panel 136 may represent a general purpose I/O ("GPIO") device or functional block. In other exemplary embodiments, the user interface 136 may include input components, such as one or more of a variety of electrical, mechanical or electro-mechanical input devices including rotary dials, push buttons, and touch pads. The user interface 136 may be in communication with the controller 180 via one or more signal lines or shared communication busses.

With reference again to FIG. 2, refrigerator appliance 100 also includes a water filter assembly 170 for filtering water coming into refrigerator appliance 100 from a water supply (not shown), such as a municipal water source or a well. Water filter assembly 170 can remove contaminants, such as chlorine, chloroform, lead, arsenic, pharmaceuticals, microbes, etc., from water supplied to refrigerator appliance 100. In particular, water filter assembly 170 can supply filtered water to the ice maker within insulated housing 142 and/or discharging outlet 134. As will be understood by those skilled in the art and as used herein, the term "water" includes purified water and solutions or mixtures containing water and, e.g., elements (such as calcium, chlorine, and fluorine), salts, bacteria, nitrates, organics and other chemical compounds or substances.

Figure 3:
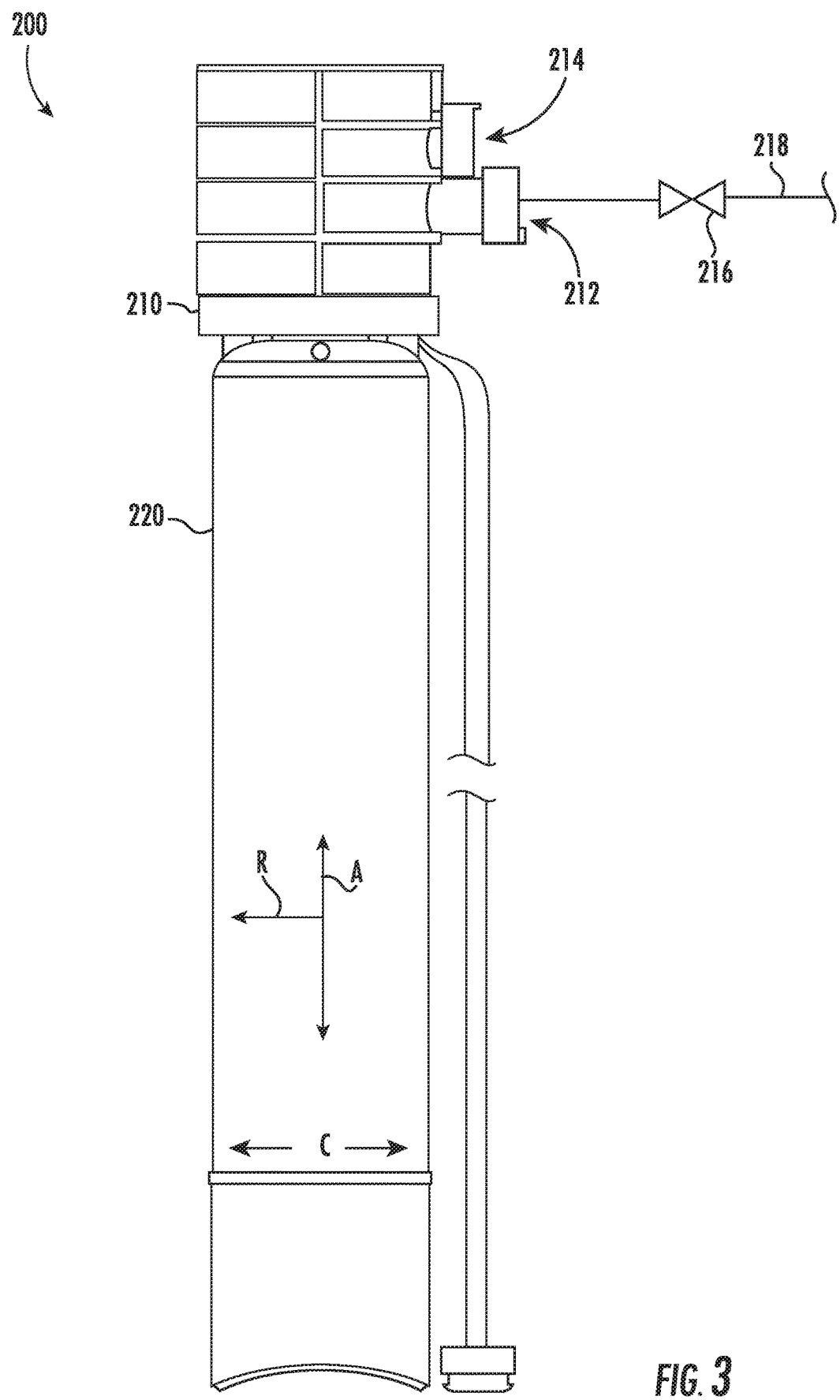
FIG. 3 provides a schematic, front elevation view of a water filter assembly according to an exemplary embodiment of the present disclosure.

FIG. 3 provides a schematic, front elevation view of a water filter assembly 200 according to an exemplary embodiment of the present disclosure. Water filter assembly 200 may be used in the refrigerator appliance 100, e.g., as water filter assembly 170 (FIG. 2). In alternative exemplary embodiments, water filter assembly 200 may be used in any other suitable appliance, such as an ice maker, as a point of use water filtration system, e.g., installed beneath a sink or for use with a shower, as part of a gravity fed filtration system, or as a point of entry water filtration system for an entire household. Thus, the present subject matter is not limited to any particular installation or location for water filter assembly 200.

Water filter assembly 200 defines an axial direction A, a radial direction R, and a circumferential direction C extending three hundred sixty degrees (360°) about the axial direction A. Water filter assembly 200 includes a manifold 210 and a filter cartridge 220 removably mounted to manifold 210. Although not shown, manifold 210 may include a mounting bracket for mounting water filter assembly 200, e.g., to housing 120 of refrigerator appliance 100 (FIG. 2), to a kitchen cabinet beneath a kitchen sink, or to a wall within a house. Manifold 210 defines an inlet 212 and an outlet 214. Inlet 212 may be in fluid communication with a water supply and may receive unfiltered water from the water supply. From inlet 212, such unfiltered water is directed into filter cartridge 220. Such unfiltered water passes through filter cartridge 220 and exits manifold 210 at outlet 214 as filtered water. Such filtered water may, e.g., be directed to the ice maker within insulated housing 142 (FIG. 2), discharging outlet 134 (FIG. 2), a kitchen sink faucet, and/or any other suitable use. In some embodiments, the positioning of the inlet 212 and the outlet 214 may be reversed.

Notably, the unfiltered water flowing into manifold 210 through inlet 212 may be pressurized. For instance, the incoming water may be pressurized between about twenty and one hundred twenty pounds per square inch (20-120 psi). Additionally, as shown in FIG. 3, a valve 216 may be positioned along a supply conduit 218 to selectively allow a flow of unfiltered water to flow downstream to water filter assembly 200. Supply conduit 218 may provide fluid communication between water supply and water filter assembly 200. Valve 216 may be communicatively coupled with controller 180 so that valve 216 may be selectively actuated between an open position and a closed position, e.g., to allow or cut off the flow of unfiltered water to water filter assembly 200.

Figure 4:
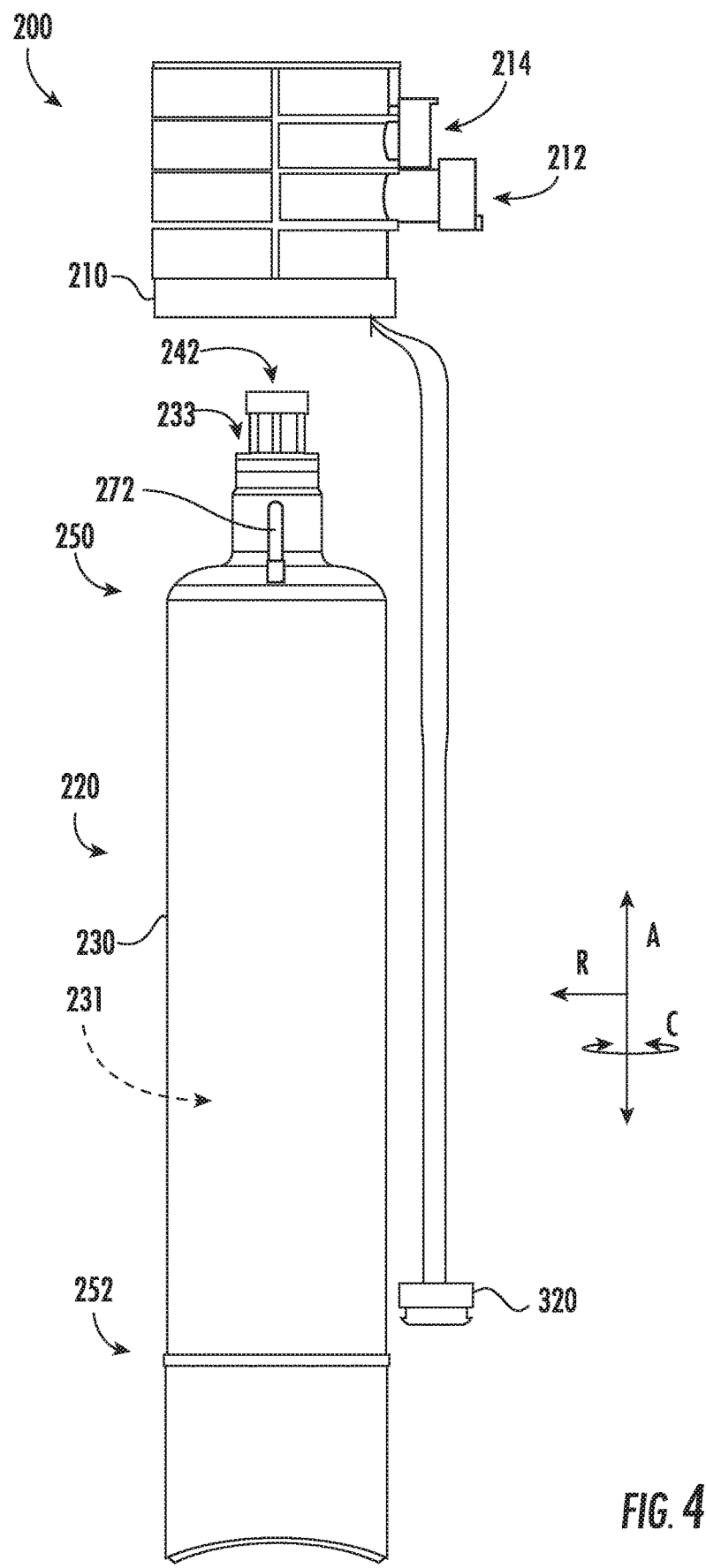
FIG. 4 provides a front elevation view of the water filter assembly of FIG. 3 depicting a filter cartridge removed from a manifold of the water filter assembly.

FIG. 4 provides a front elevation view of water filter assembly 200 of FIG. 3 depicting filter cartridge 220 removed from manifold 210. As shown, filter cartridge 220 includes a casing, sheath or housing 230 that defines an interior volume or chamber 231. Housing 230, e.g., an annular sidewall of housing 230, extends between a top portion 250 and a bottom portion 252, e.g., along the axial direction A. Housing 230 also defines an opening 233 at top portion 250 of housing 230. Opening 233 permits access to chamber 231 of housing 230. Housing 230 may have only one opening 233 through housing 230 to chamber 231, in certain exemplary embodiments, e.g., such that all fluid flow into and out of chamber 231 passes through opening 233.

Figure 5:
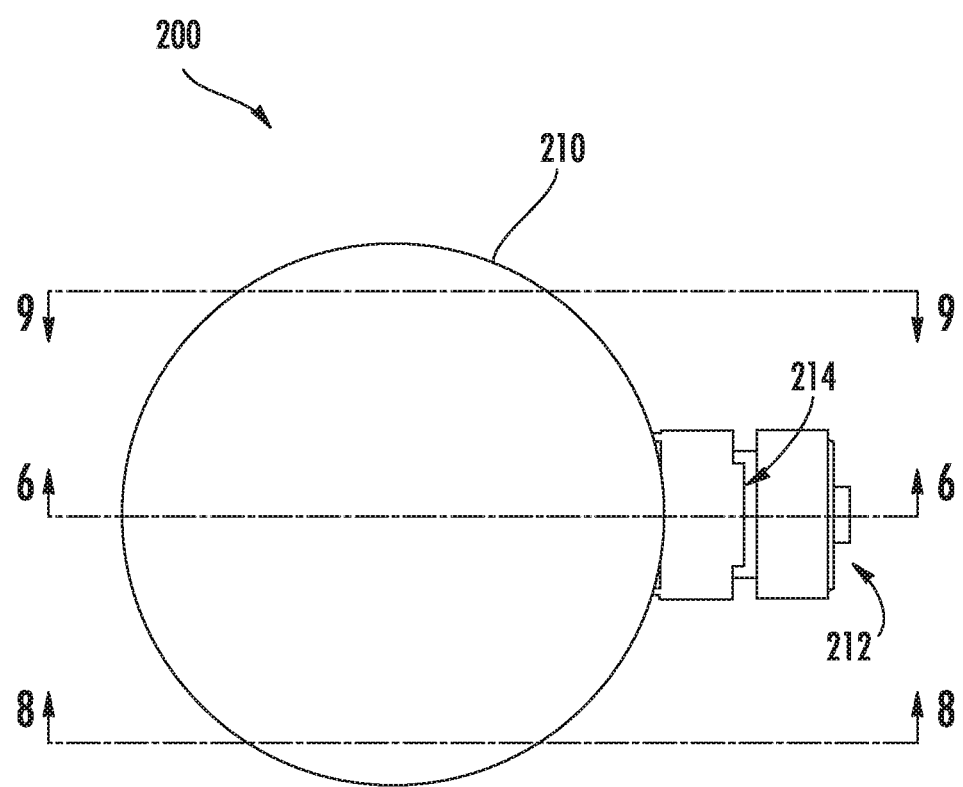
FIG. 5 provides a top plan view of the water filter assembly of FIG. 3.
Figure 6:
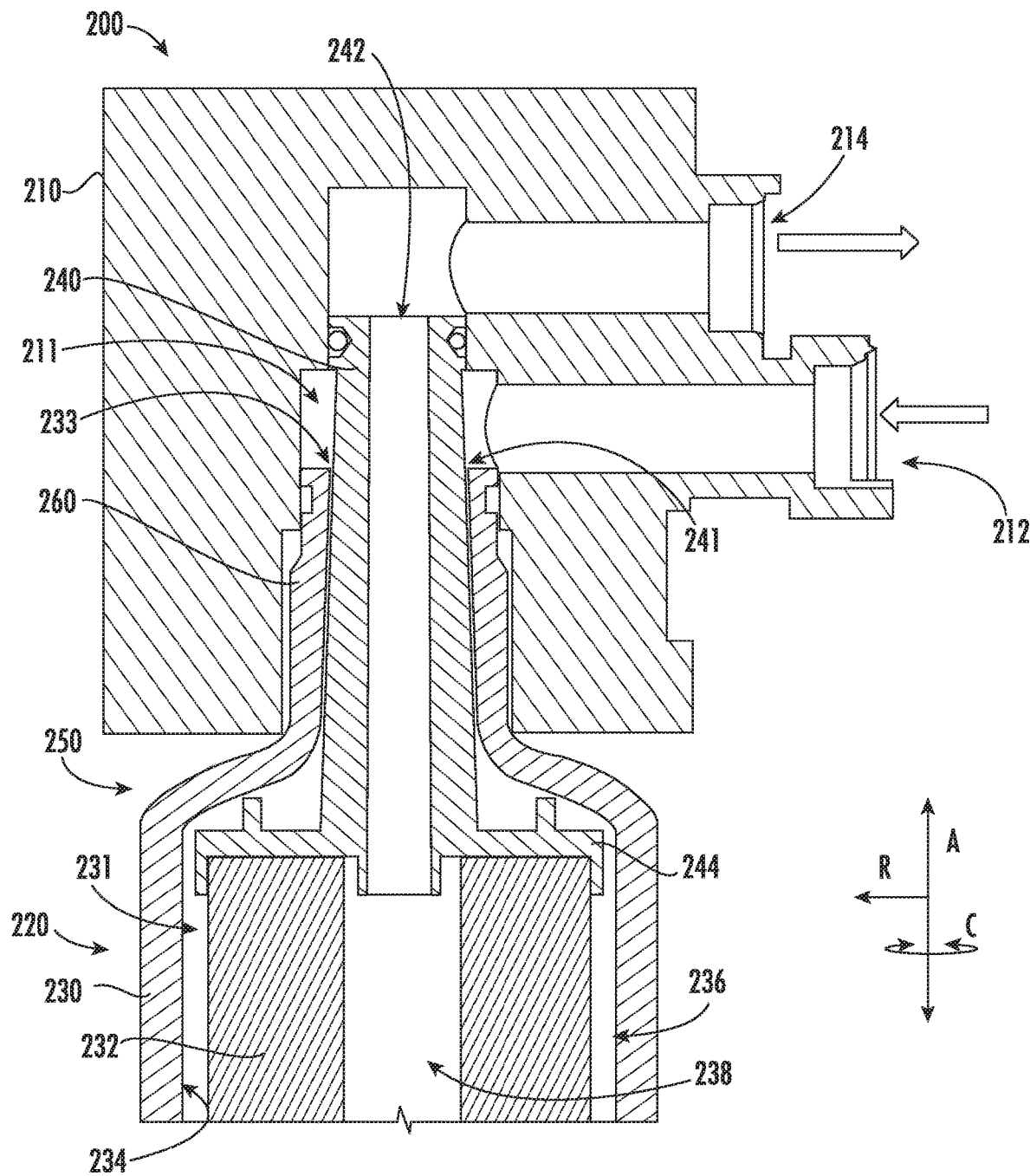
FIG. 6 provides a close up, cross sectional view of the filter cartridge mounted to the manifold taken along line 6-6 of FIG. 5.

FIGS. 5 and 6 provide various views of the water filter assembly 200 of FIG. 3. More specifically, FIG. 5 provides a top plan view of the water filter assembly 200 of FIG. 3 and FIG. 6 provides a close up, cross sectional view of filter cartridge 220 mounted to manifold 210 taken along line 6-6 of FIG. 5. As shown, housing 230 of filter cartridge 220 includes a port or neck 260, e.g., at top portion 250 of housing 230. Opening 233 may be positioned at or defined at neck 260 of housing 230. As shown in FIG. 6, a sleeve 240 is received within opening 233 at neck 260. When inserted, sleeve 240 defines a first passage or inlet 241 and a second passage or outlet 242 of filter cartridge 220. Inlet 241 is in fluid communication with inlet 212 of manifold 210 and with chamber 231 of housing 230. Thus, unfiltered water can enter chamber 231 of housing 230 through inlet 241. Outlet 242 is in fluid communication with outlet 214 of manifold 210 and chamber 231 of housing 230. Thus, filtered water can exit chamber 231 of housing 230 through outlet 242. When filter cartridge 220 is mounted to manifold 210, a main chamber 211 defined by manifold 210 receives a portion of sleeve 240 and neck 260 of filter cartridge 220.

A filter media 232 is disposed within chamber 231. Filter media 232 is spaced apart from an inner surface 234 of housing 230, e.g., along the radial direction R, within chamber 231. A cap 244 of sleeve 240 may be positioned within chamber 231 on filter media 232 at top portion 250 of housing 230 in order to define a radial gap between inner surface 234 of housing 230 and an outer surface of filter media 232. As an example, cap 244 may be glued or in some other manner fixed to filter media 232 in order to define the radial gap, position filter media 232 vertically, and block potential bypass flow around filter media 232 to outlet 242.

Filter media 232 also divides chamber 231 into an unfiltered volume 236 and a filtered volume 238. Filter media 232 can remove impurities and contaminants from water passing through filter media 232 from the unfiltered volume 236 to the filtered volume 238. Filter media 232 may include any suitable mechanism for filtering water such as, e.g., ceramic filters, activated carbon filters, polymer filters, membrane filters, sediment type filters, or reverse osmosis filters. As used herein, the term "unfiltered" describes a volume within chamber 231 that is not filtered relative to filter media 232. However, it will be understood that water filter assembly 200 may include additional filters that filter water entering chamber 231. Thus, "unfiltered volume" may be filtered relative to other filters but not filter media 232.

As an example, water passing though water filter assembly 200 can follow a path through water filter assembly 200. In particular, unfiltered water can enter water filter assembly 200 through inlet 212 of manifold 210. Such unfiltered water can then flow though inlet 241 into the unfiltered volume 236 of chamber 231. Such unfiltered water can pass though filter media 232 to remove impurities and can exit filter media 232 into the filtered volume 238 of chamber 231 as filtered water. Such filtered water can then pass through outlet 242 and exit water filter assembly 200 through outlet 214 of manifold 210.

In such a manner, unfiltered water can follow the path through water filter assembly 200. In particular, unfiltered water can pass though filter media 232, and filtered water can exit water filter assembly 200. Such filtering can improve taste and/or safety of water. However, effectiveness of filter media 232 can decrease over time, e.g., due to pores of filter media 232 becoming clogged, pore surfaces becoming saturated with contaminates, and/or bacteria can accumulate or grow within filter media 232 over time. Thus, filter media 232 and/or filter cartridge 220 may require replacement or servicing after a certain time interval in order to maintain proper operation of water filter assembly 200. In particular, filter media 232 and/or filter cartridge 220 may require replacement or servicing about every six months. In accordance with exemplary aspects of the present disclosure, as discussed in greater detail below, water filter assembly 200 includes features that facilitate removal and mounting of filter cartridge 220 from or to manifold 210 of water filter assembly 200.

Figure 7:
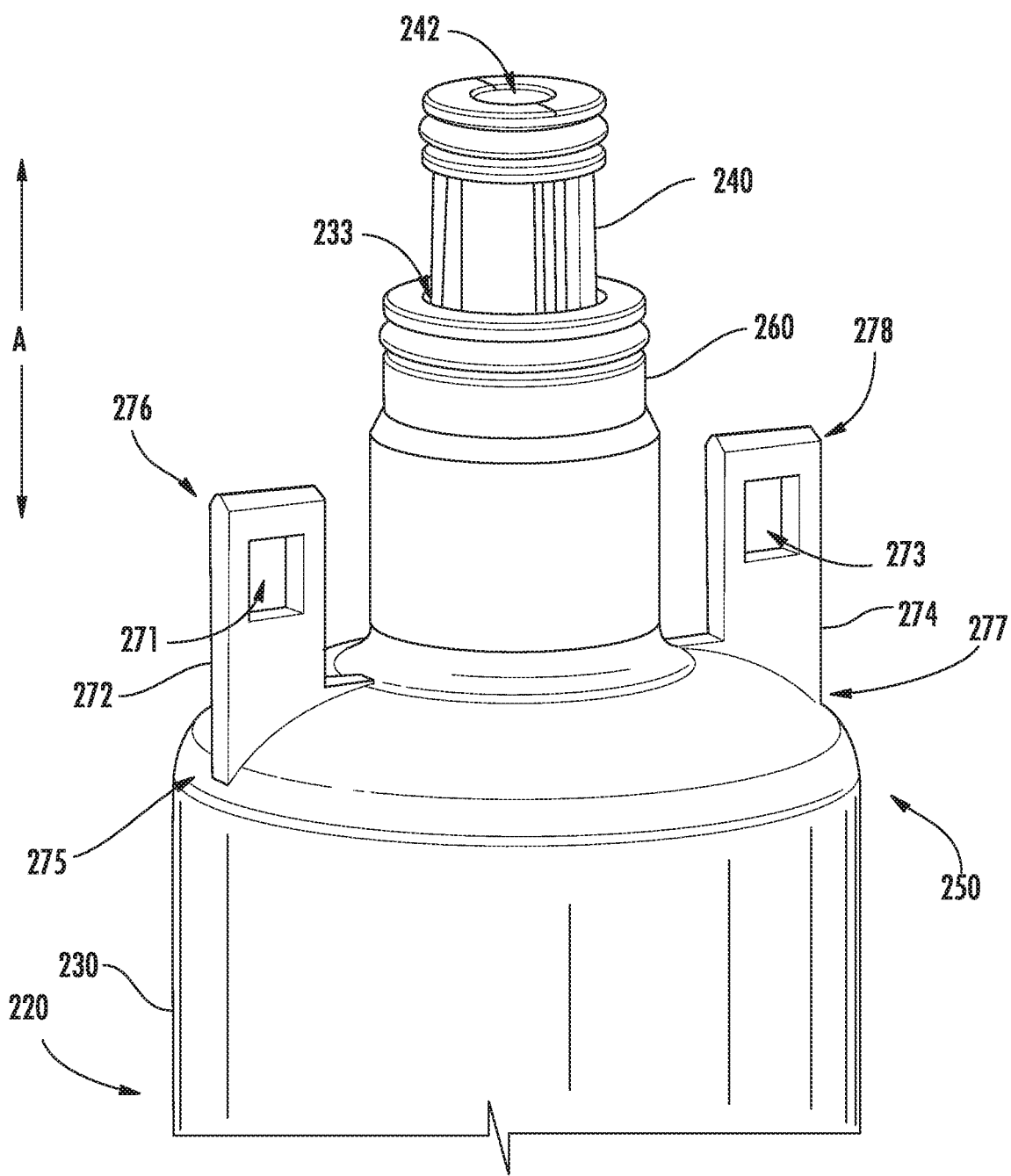
FIG. 7 provides a close up, perspective view of the filter cartridge of the water filter assembly of FIG. 3.
Figure 8:
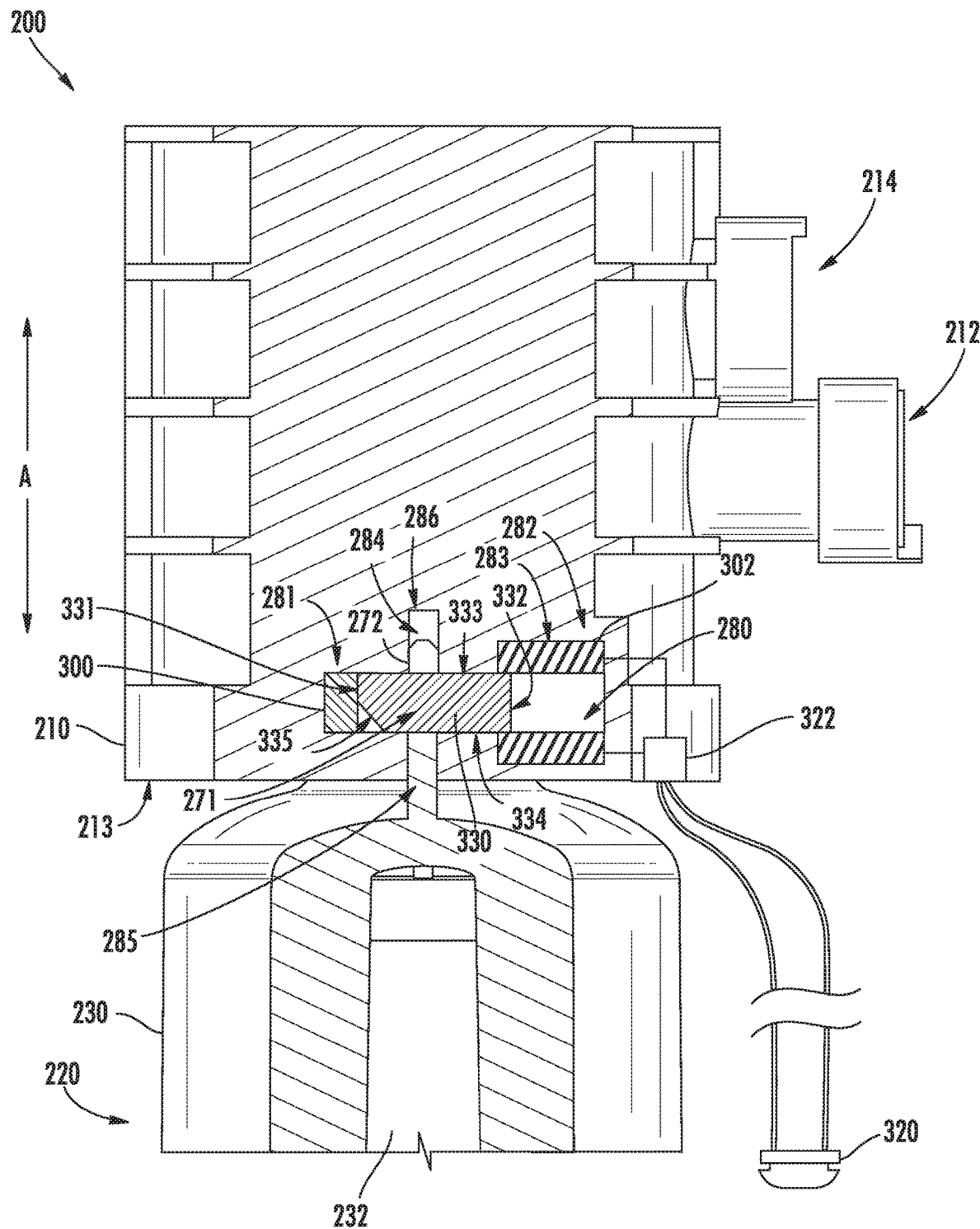
FIG. 8 provides a close up, cross sectional view of the filter cartridge mounted to the manifold of the water filter assembly of FIG. 3 taken along line 8-8 of FIG. 5 and depicts a first magnetic plunger in a first position.
Figure 9:
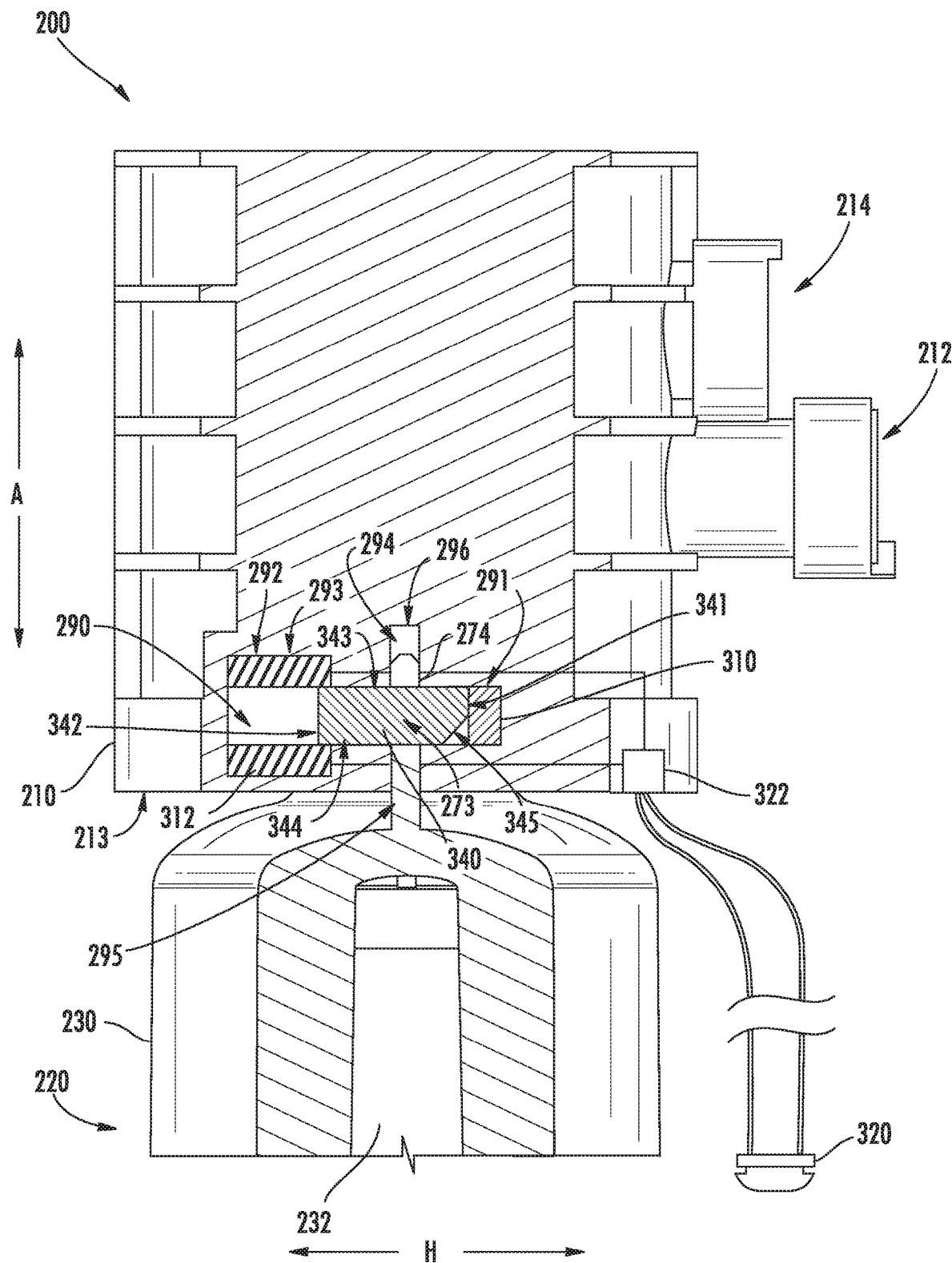
FIG. 9 provides a close up, cross sectional view of the filter cartridge mounted to the manifold of the water filter assembly of FIG. 3 taken along line 8-8 of FIG. 5 and depicts a second magnetic plunger in a first position.
Figure 10:
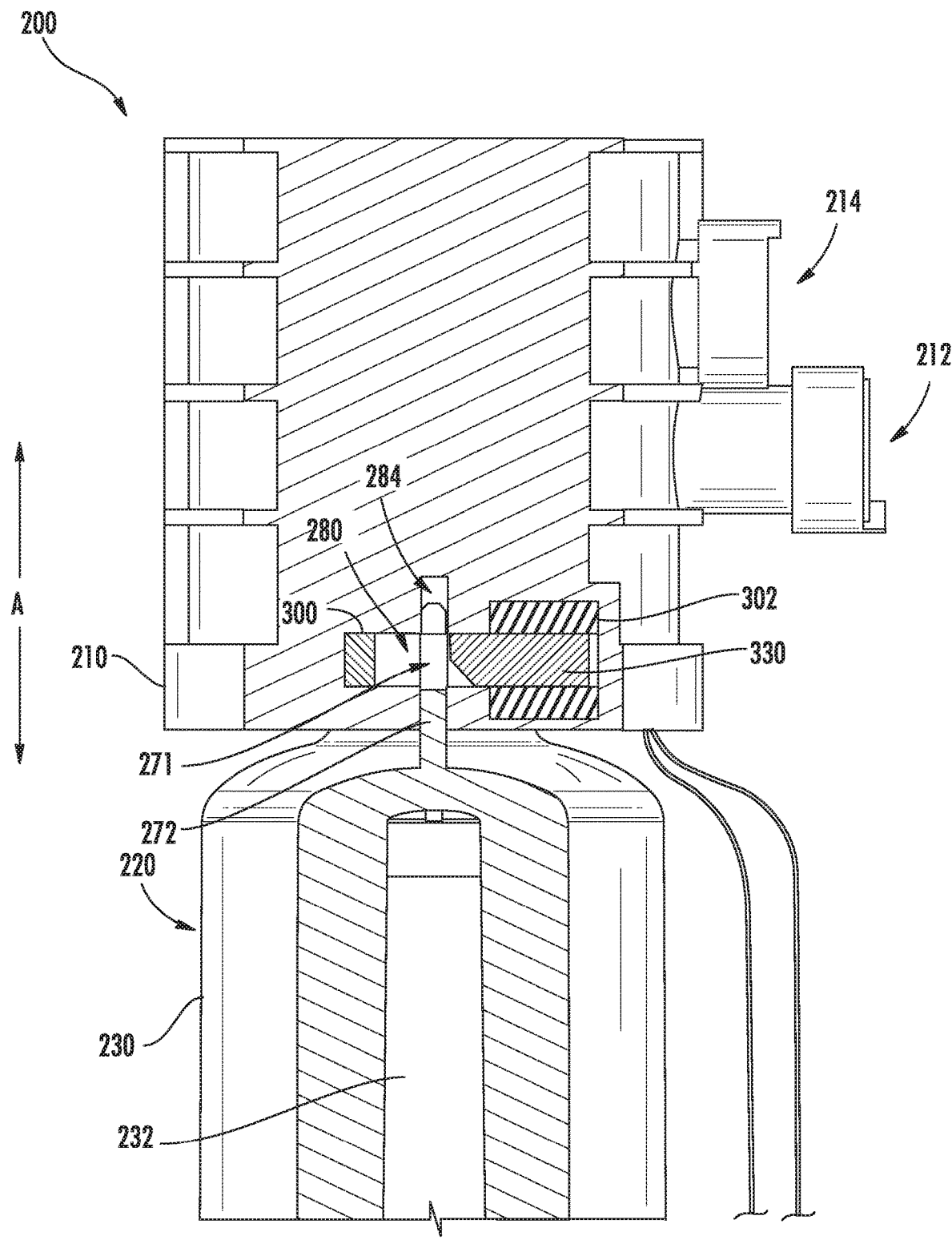
FIG. 10 provides a close up, cross sectional view of the filter cartridge mounted to the manifold of the water filter assembly of FIG. 3 and depicting the plunger in a second position.
Figure 11:
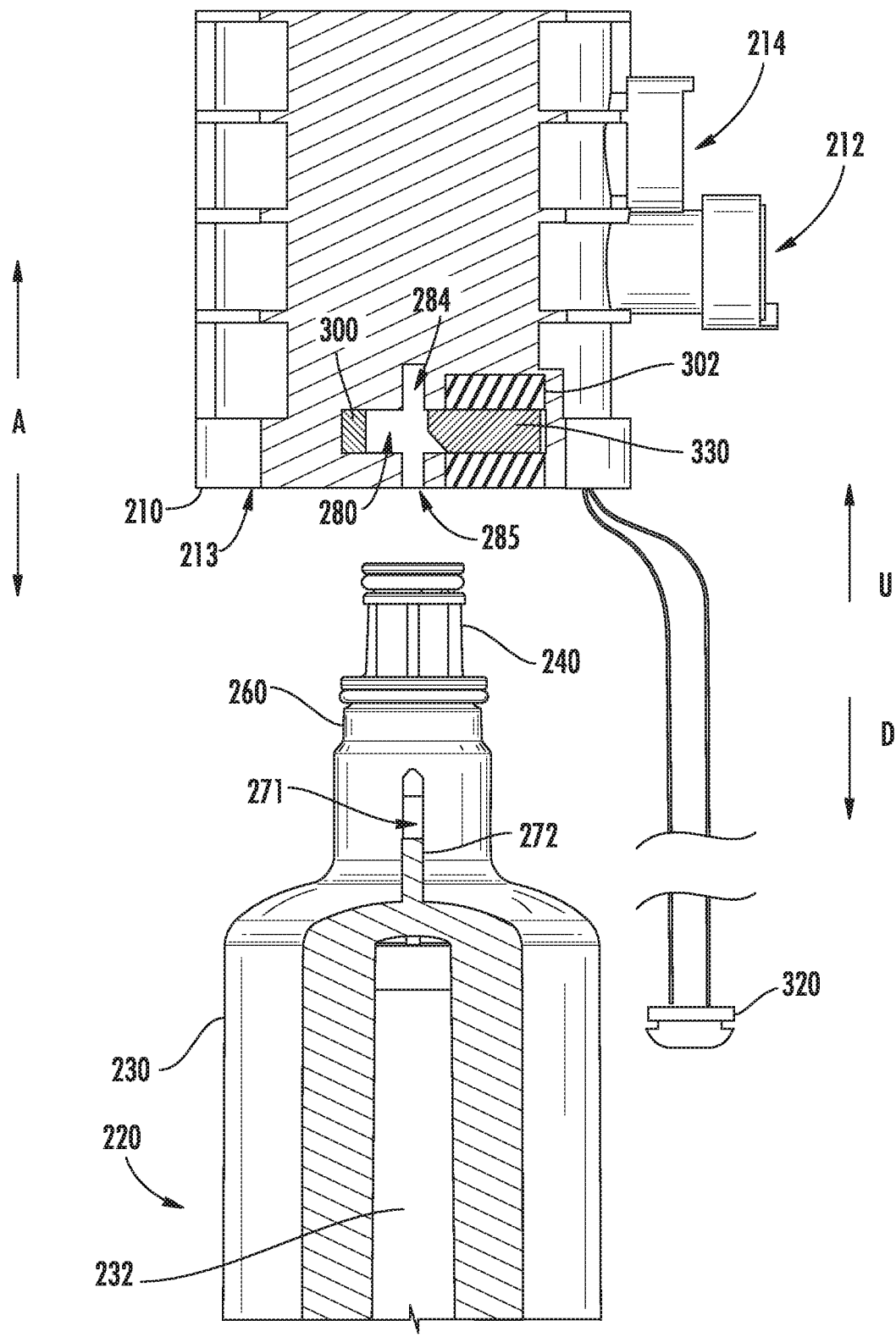
FIG. 11 provides a close up, cross sectional view of the filter cartridge removed from the manifold of the water filter assembly of FIG. 3.

FIGS. 7, 8, 9, 10, and 11 provide one exemplary embodiment of water filter assembly 200 having an electromagnet interface. In particular, FIG. 7 provides a close up, perspective view of top portion 250 of filter cartridge 220 of the water filter assembly 200. FIG. 8 provides a close up, cross sectional view of filter cartridge 220 mounted to manifold 210 taken along line 8-8 of FIG. 5 and depicts a first magnetic plunger 330 in a first position. FIG. 9 provides a close up, cross sectional view of filter cartridge 220 mounted to manifold 210 taken along line 9-9 of FIG. 5 and depicts a second magnetic plunger 340 in a first position. FIG. 10 provides a close up, cross sectional view of filter cartridge 220 mounted to manifold 210 and depicts first magnetic plunger 330 in a second position. FIG. 11 provides a close up, cross sectional view of filter cartridge 220 removed from manifold 210.

As shown in FIG. 7, filter cartridge 220 includes a first securing member 272 and a second securing member 274 projecting from housing 230 at top portion 250 of filter cartridge 220. In particular, for this embodiment, first securing member 272 and second securing member 274 each have a length projecting or extending from housing 230 of filter cartridge 220 along the axial direction A. First securing member 272 extends between a proximal end 275 and a distal end 276, e.g., along the axial direction A, and second securing member 274 extends between a proximal end 277 and a distal end 278, e.g., along the axial direction A. First and second securing members 272, 274 each include chamfered edges at their respective distal ends 276, 278. The chamfered edges facilitate insertion of the first and second securing members 272, 274 into respective slits, as will be described in greater detail below.

Moreover, for this embodiment, first securing member 272 and second securing member 274 extend from housing 230 or are positioned radially opposite one another. That is, first securing member 272 and second securing member 274 are positioned about one hundred eighty degrees (180°) from one another along the radial direction R. First securing member 272 and second securing member 274 may be made of any suitable material, e.g., a plastic material. First and second securing members 272, 274 may be integrally formed with housing 230 as a single, continuous piece, or alternatively, first and second securing members 272, 274 may be attached or affixed to housing 230.

As further shown in FIG. 7, for this embodiment, first and second securing members 272, 274 each define an opening. In particular, first securing member 272 defines a first opening 271 and second securing member 274 defines a second opening 273. First opening 271 extends through first securing member 272 and has a generally rectangular shape. However, other geometries are possible. Likewise, second opening 273 extends through second securing member 274 and has a generally rectangular shape; other geometries are also possible. As will be explained further below, when filter cartridge 220 is mounted to manifold 210, first opening 271 and second opening 273 receive respective magnetic plungers therethrough, which secures filter cartridge 220 to manifold 210.

As shown in FIG. 8, manifold 210 defines a first groove 280 that extends between a first end 281 and a second end 282, e.g., along a direction orthogonal to the axial direction A. For this embodiment, first groove 280 has a generally rectangular-shaped cross section, e.g., from the perspective of FIG. 8, except that first groove 280 has an envelope portion 283 at or proximate its second end 282. Envelope portion 283 of first groove 280 has a greater height than the remaining portion of first groove 280, e.g., along the axial direction A, and extends along a portion of the length of first groove 280 along a direction that is orthogonal to the axial direction A. In addition, manifold 210 defines a first slit 284 that is in communication with first groove 280. First slit 284 extends between an opening 285 defined in a bottom wall 213 of manifold 210 and a blind end 286, e.g., along the axial direction A. First slit 284 is in communication with first groove 280 in that the two intersect one another. First groove 280 extends along a direction orthogonal to the axial direction A between blind end 286 of first slit 284 and bottom wall 213 of manifold 210 along the axial direction A. Stated differently, first slit 284 extends above or further vertically upward than first groove 280, e.g., along the axial direction A. First slit 284 is sized to receive first securing member 272 of filter cartridge 220 as shown in FIG. 8.

As shown in FIG. 9, manifold 210 defines a second groove 290 extending between a first end 291 and a second end 292, e.g., along a direction orthogonal to the axial direction A. Second groove 290 has an envelope portion 293 at or proximate its second end 292. Envelope portion 293 of second groove 290 has a greater height than the remaining portion of second groove 290, e.g., along the axial direction A, and extends along a portion of the length of second groove 290 along a direction that is orthogonal to the axial direction A. Further, manifold 210 defines a second slit 294 extending between an opening 295 defined in bottom wall 213 of manifold 210 and a blind end 296, e.g., along the axial direction A. Second slit 294 is in communication with second groove 290. Thus, generally, second groove 290 and second slit 294 are configured in the same manner as first groove 280 and first slit 284, respectively, except that second groove 290 is flipped along a horizontal direction H as viewed from the perspective of FIG. 9. The horizontal direction H is a direction orthogonal to the axial direction A. Further, first groove 280 and second groove 290 are defined radially opposite one another, e.g., along the radial direction R. That is first groove 280 is spaced three hundred sixty degrees (360°) from second groove 290 along the circumferential direction C.

With reference again to FIG. 8, as shown, a first magnet 300 is disposed within first groove 280. In particular, first magnet 300 is disposed at first end 281 of first groove 280. First magnet 300 is attached to one or more walls of manifold 210. In addition, a first conducting coil 302 is disposed within first envelope portion 283 of first groove 280. Moreover, first magnetic plunger 330 is slideably received within first groove 280 and is movable between a first position (FIG. 8) and a second position (FIGS. 10 and 11). First magnetic plunger 330 has a first wall 331 and an opposing second wall 332 that are spaced from each other e.g., along a direction that is orthogonal to the axial direction A. First magnetic plunger 330 also has a top wall 333 and an opposing bottom wall 334 that are spaced from one another, e.g., along the axial direction A. Further, first magnetic plunger 330 has a chamfered or ramped edge 335 extending between first wall 331 and bottom wall 334. Ramped edge 335 facilitates movement of first magnetic plunger 330 into and out of first opening 271 of first securing member 272 when moved first magnetic plunger 330 is moved between the first and second positions. First magnetic plunger 330 may be made of any suitable material capable of being magnetically attracted to first magnet 300. For instance, in some embodiments, first magnetic plunger 330 is formed of a ferromagnetic material.

With reference again to FIG. 9, as shown, a second magnet 310 is disposed within second groove 290. More specifically, second magnet 310 is disposed at first end 291 of second groove 290. Second magnet 310 is attached to one or more walls of manifold 210. Further, a second conducting coil 312 is disposed within second envelope portion 293 of second groove 290. Moreover, second magnetic plunger 340 is slideably received within second groove 290 and is movable between a first position (FIG. 9) and a second position (not shown). Second magnetic plunger 340 has a first wall 341 and an opposing second wall 342 that are spaced from each other e.g., along a direction that is orthogonal to the axial direction A. Second magnetic plunger 340 also has a top wall 343 and an opposing bottom wall 344 that are spaced from one another, e.g., along the axial direction A. Further, second magnetic plunger 340 has a chamfered or ramped edge 345 extending between first wall 341 and bottom wall 344. Ramped edge 345 facilitates movement of second magnetic plunger 340 into and out of second opening 273 of second securing member 274 when moved between the first and second positions. Second magnetic plunger 340 may be made of any suitable material capable of being magnetically attracted to second magnet 310. For instance, in some embodiments, second magnetic plunger 340 is formed of a ferromagnetic material.

As further shown in FIGS. 8 and 9, for this embodiment, filter interface assembly 170 includes an activation mechanism 320 that is in electrical communication with first conducting coil 302 (FIG. 8) and second conducting coil 312 (FIG. 9), e.g., via electrical wires. When activation mechanism 320 is activated, a current is directed from a power supply 322 (e.g., a battery) through first and second conducting coils 302, 312 to induce a magnetic field. As will be explained further below, by inducing a magnetic field, the polarity of the first and second magnetic plungers 330, 340 may be reversed. As such, the first and second magnetic plungers 330, 340 may either be repelled by or attracted to their respective first and second magnets 300, 310. This may ease removal of filter cartridge 220 from manifold 210 or may secure filter cartridge 220 to manifold 210. Activation mechanism 320 may be any suitable device that allows a user to activate the flow of current through one or both of first and second conducting coils 302, 312. As one example, activation mechanism 320 is a push button. As another example, activation mechanism 320 is an input selector of panel 136 (FIG. 1). As yet another example, activation mechanism 320 is a user device communicatively coupled with controller 180 of refrigerator appliance 100.

Figures 12, 13:
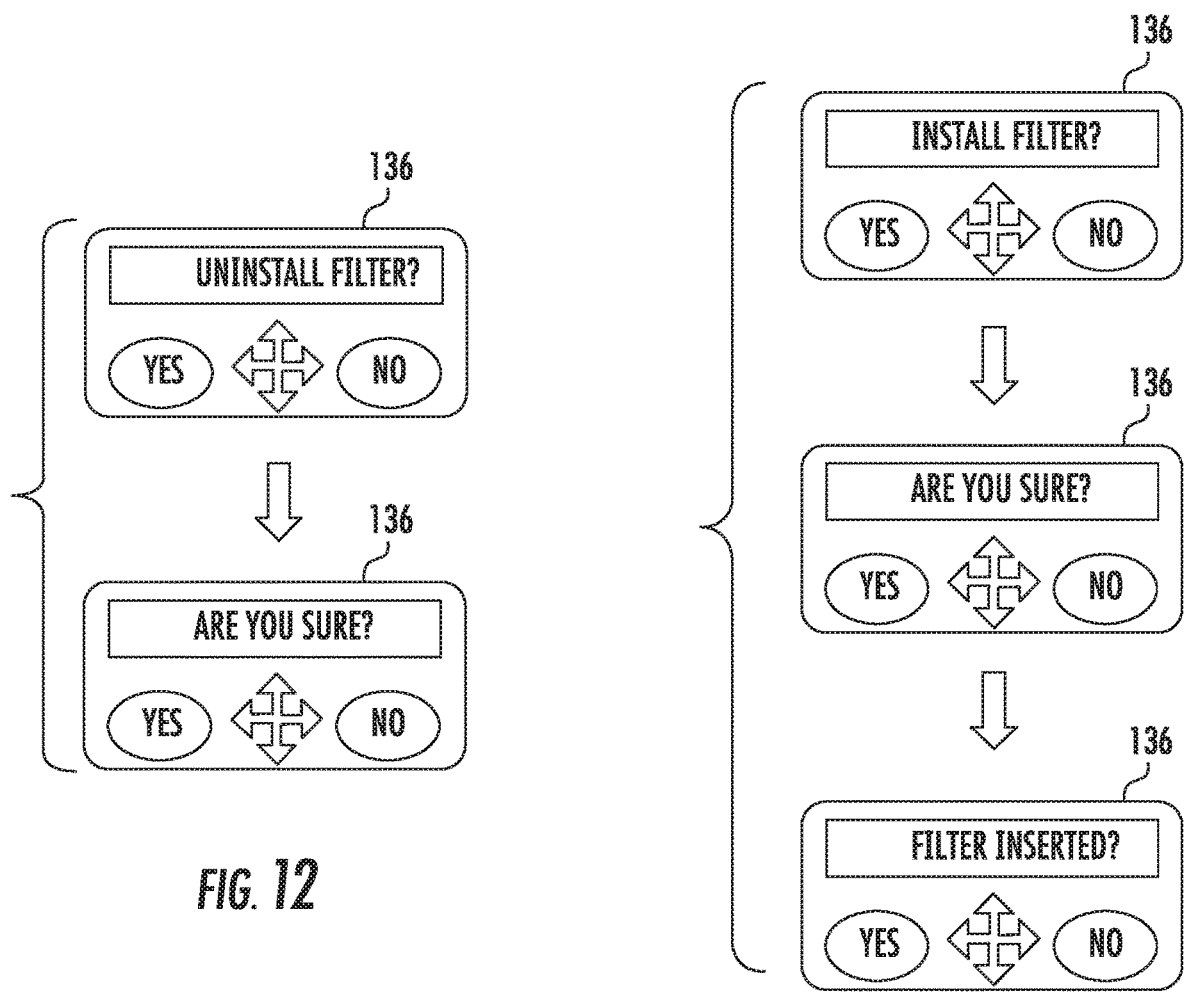
FIG. 12 provides a sequence flow chart of one exemplary method for ensuring safe removal of the filter cartridge to the manifold according to an exemplary embodiment of the present disclosure.
FIG. 13 provides a sequence flow chart of one exemplary method for ensuring safe installation of the filter cartridge to the manifold according to an exemplary embodiment of the present disclosure.

With reference now to FIGS. 8 through 12, one exemplary manner in which filter cartridge 220 may be removed from manifold 210 is will now be described. First, the flow of water to manifold 210 is shut off. As one example, as shown in FIG. 12, a user may use input selectors and display of user interface panel 136 to indicate that filter removal is desired. A user may select "Yes" when "Uninstall filter?" is prompted on the display of user interface panel 136. To confirm, the user may be prompted with a confirmation prompt "Are you sure?" The user may confirm by once again selecting "Yes." Once a user has communicated a desire to remove filter cartridge 220 from manifold 210 and confirmed such intent, controller 180 (FIG. 1) controls valve 216 (FIG. 3) to move to a closed position so that the flow of water is shut off to manifold 210 of water filter assembly 200. As such, filter cartridge 220 may be safely removed from manifold 210 (i.e., without pressurized water spilling out). In alternative exemplary embodiments, refrigerator appliance 100 or another appliance for which water filter assembly 200 provides filtering capability may include alternative mechanical features that shut off the water flow to manifold 210 to ensure safe mounting and removal of filter cartridge 220 to manifold 210.

Figure 14:
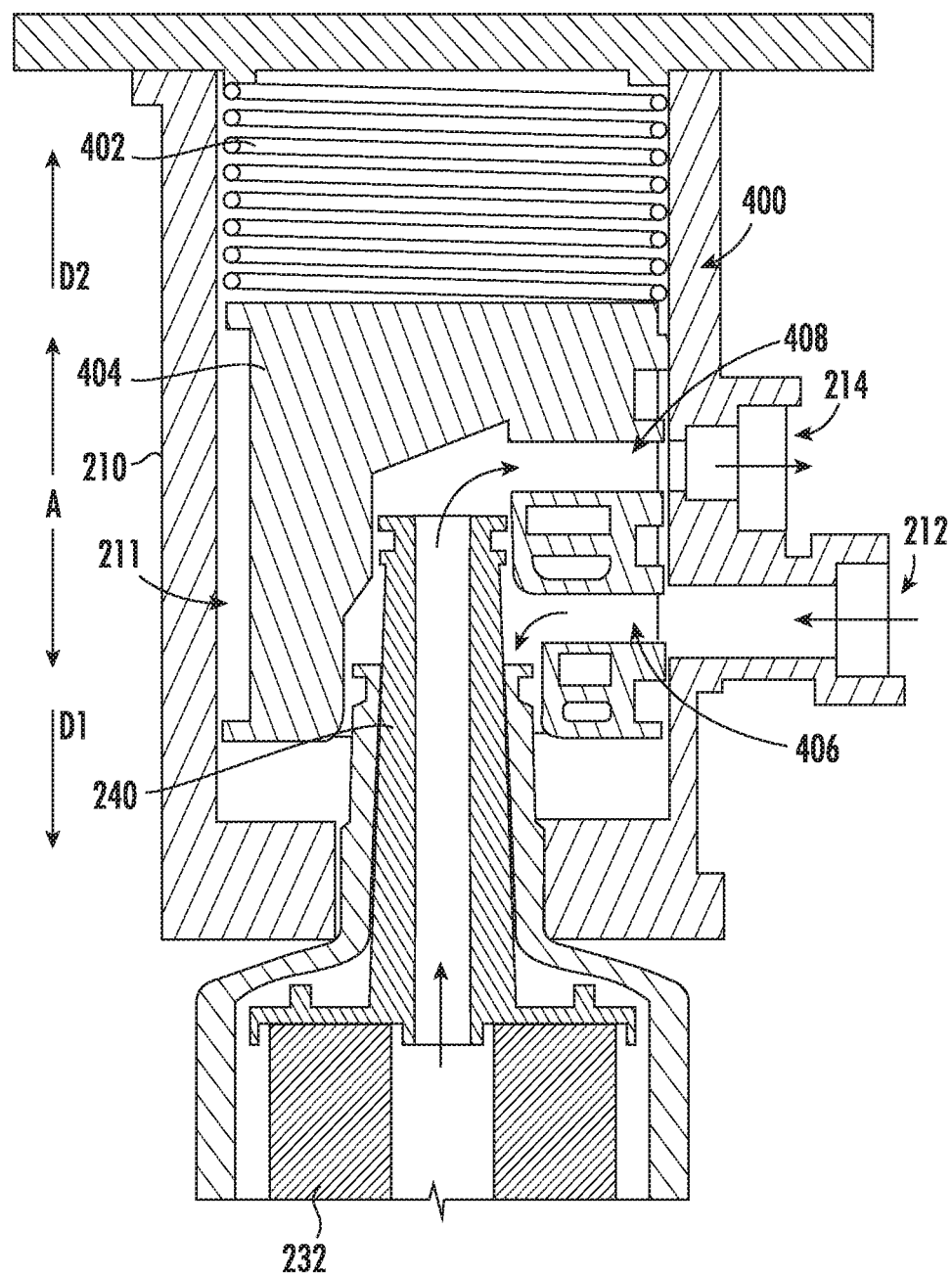
FIG. 14 provides a close up, cross sectional view of a filter cartridge mounted to a manifold having an exemplary water shutoff assembly disposed within a main chamber defined by the manifold according to an exemplary embodiment of the present disclosure.
Figure 15:
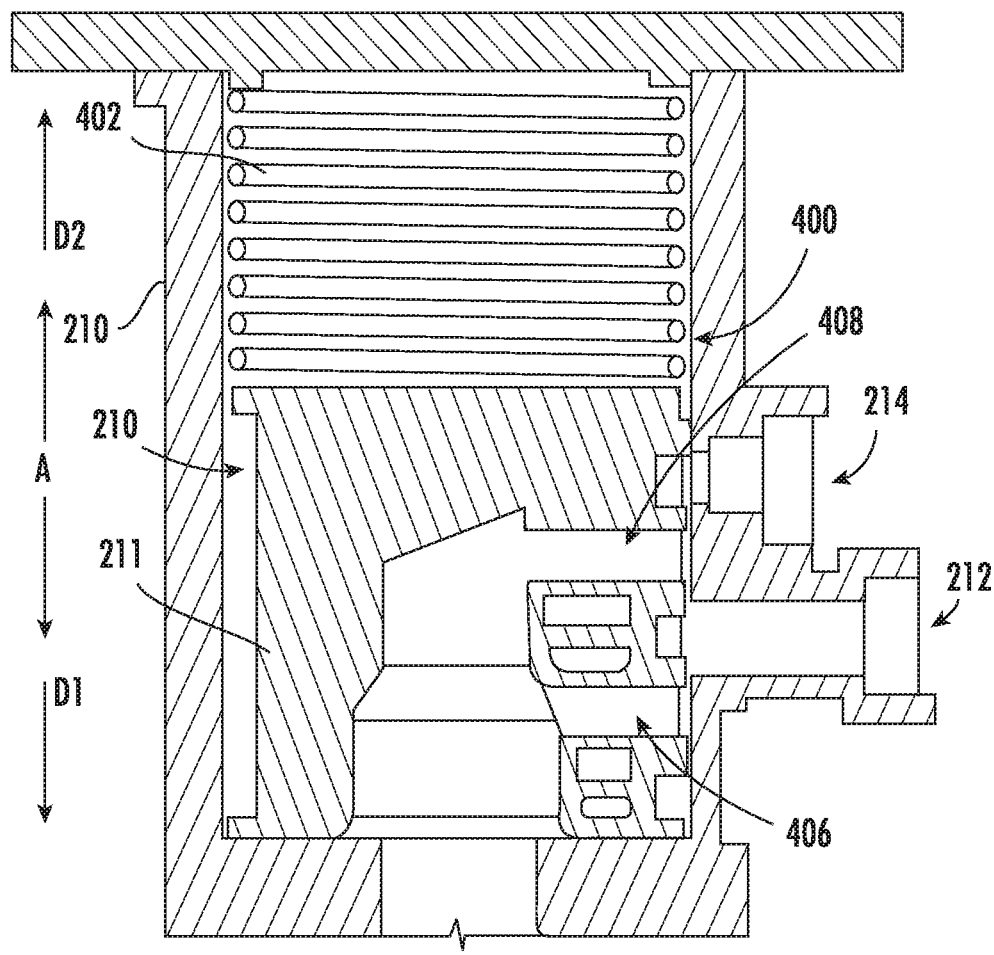
FIG. 15 provides a close up, cross sectional view of the manifold and the exemplary water shutoff assembly disposed within the main chamber defined by the manifold with the filter cartridge removed from the manifold according to an exemplary embodiment of the present disclosure.

In some embodiments, manifold 210 may include mechanical features that selectively allow flow of water to manifold 210. As one example, FIGS. 14 and 15 provide cross sectional views of manifold 210 and depict a water shutoff assembly 400 disposed therein for shutting off the flow of water to manifold 210 when filter cartridge 220 is removed from manifold 210 and allowing a flow of water to manifold 210 when filer cartridge 220 is mounted thereto. For this embodiment, main chamber 211 is defined by manifold 210 in a generally cylindrical shape that extends substantially along the axial length of manifold 210. Water shutoff assembly 400 includes a spring 402 and a chute 404 that are each received within main chamber 211. In particular, chute 404 is slideably received within main chamber 211 and is movable along the axial direction A. Chute 404 is movable in a first direction D1 along the axial direction A by spring 402, which is a downward direction in this embodiment. That is, when filter cartridge 220 is removed from manifold 210, spring 402 expands causing chute 404 to move in the first direction D1. Chute is also movable in a second direction D2 along the axial direction A by sleeve 240 and neck 260 of filter cartridge 220 as filter cartridge 220 is mounted to manifold 210. In this embodiment, the second direction D2 is an upward direction along the axial direction A. When filter cartridge 220 is mounted to manifold 210, sleeve 240 and neck 260 force chute 404 in the second direction D2 and overcome the spring force of spring 402, which causes spring 402 to compress, e.g., as shown in FIG. 14. The various components of the electromagnetic interface lock filter cartridge 220, chute 404, and spring 402 in place, e.g., along the axial direction A, as will be explained more fully below. Accordingly, chute 404 is movable between a first position (FIG. 15) and a second position (FIG. 14) along the axial direction A.

Chute 404 defines an inlet passage 406 and an outlet passage 408. As shown in FIG. 15, when chute 404 is the first position, inlet passage 406 is not in fluid communication with inlet 212 of manifold 210 and outlet passage 408 is not in fluid communication with outlet 214 of manifold 210, and thus, water is shutoff from manifold 210. In contrast, as shown in FIG. 14, when chute 404 is the second position, inlet passage 406 is in fluid communication with inlet 212 of manifold 210 and outlet passage 408 is in fluid communication with outlet 214 of manifold 210, and thus, water is allowed to flow through manifold 210 and ultimately be filtered by filter media 232.

Returning to FIG. 8, after shutting off the water flow to water filter assembly 200, filter cartridge 220 may be removed from manifold 210. To do so, the first and second magnetic plungers 330, 340 are moved from their respective first positions (shown in FIGS. 8 and 9, respectively), to their respective second positions (the second position of the first magnetic plunger 330 is shown in FIG. 10 and the second position of the second magnetic plunger 340 is not shown). As one example, to move first and second magnetic plungers 330, 340 from their respective first positions to their respective second positions, a user activates activation mechanism 320 such that electric current is directed from power supply 322 through one or both of first and second conducting coils 302, 312 surrounding at least a portion of first and second magnetic plungers 330, 340, respectively. When electric current passes through the coils 302, 312, a magnetic field is generated around or about the coils according to Ampère's right-hand rule. In turn, a magnetic field is induced in first and second magnetic plungers 330, 340. By controlling the flow direction of electric current through the coils 302, 312, the magnetic polarity of first magnetic plunger 330 and second magnetic plunger 340 may be reversed, respectively. In particular, electric current can be directed through first conducting coil 302 such that the magnetic polarity of first wall 331 of first magnetic plunger 330 has the same magnetic polarity as a contact surface (i.e., the surface of first magnet 300 shown contacting first wall 331 of first magnetic plunger 330 in FIG. 8) of first magnet 300 and/or electric current can be directed through second conducting coil 312 such that the magnetic polarity of first wall 341 of second magnetic plunger 340 has the same magnetic polarity as a contact surface (i.e., the surface of second magnet 310 shown contacting first wall 341 of second magnetic plunger 340 in FIG. 9) of second magnet 310.

For instance, when electric current is directed from power supply 322 through first conducting coil 302, first wall 331 of first magnetic plunger 330 may have a north N or negative polarity and the contact surface of first magnet 300 may likewise have a north N or negative polarity. Similarly, when electric current is directed through second conducting coil 312, first wall 341 of second magnetic plunger 340 may have a north N or negative polarity and the contact surface of second magnet 310 may likewise have a north N or negative polarity. Accordingly, first wall 331 of first magnetic plunger 330 is repelled from the contact surface of first magnet 300 and first wall 341 of second magnetic plunger 340 is repelled from the contact surface of second magnet 310. In other embodiments, first wall 331 of first magnetic plunger 330 may have a south S or positive polarity and the contact surface of first magnet 300 may likewise have a south S or positive polarity and first wall 341 of second magnetic plunger 340 may have a south S or positive polarity and the contact surface of second magnet 310 may likewise have a south S or positive polarity.

The repulsion of first magnetic plunger 330 from first magnet 300 drives or moves first magnetic plunger 330 from the first position (FIG. 8) to the second position (FIG. 10). When first magnetic plunger 330 becomes positioned in the second position, first magnetic plunger 330 is no longer received within first opening 271 of first securing member 272 and first wall 331 of first magnetic plunger 330 clears first slit 284 so that first magnetic plunger 330 is positioned between the second end 282 of first groove 280 and first slit 284. That is, first wall 331 of first magnetic plunger 330 is no longer in alignment with first slit 284 along the axial direction A. Consequently, first securing member 272 may be removed from first slit 284. In a similar way, the repulsion of second magnetic plunger 340 from second magnet 310 drives or moves second magnetic plunger 340 from the first position (FIG. 9) to the second position (not shown). When second magnetic plunger 340 becomes positioned in the second position, second magnetic plunger 340 is no longer received within second opening 273 of second securing member 274 and first wall 341 of second magnetic plunger 340 clears second slit 294 so that second magnetic plunger 340 is positioned between the second end 292 of second groove 290 and second slit 294. That is, first wall 341 of second magnetic plunger 340 is no longer in alignment with second slit 294 along the axial direction A. Consequently, second securing member 274 may be removed from second slit 294. Once first securing member 272 and second securing members 274 are removed from their respective first and second slits 284, 294, filter cartridge 220 may be removed from manifold 210 as shown in FIG. 11. In particular, for this embodiment, filter cartridge 220 is moved downward along the axial direction A, as denoted by arrow D in FIG. 11. Notably, in some embodiments, electric current is needed and used only momentarily to release filter cartridge 220 from manifold 210 (i.e., to move the magnetic plungers to their respective second positions so that the first and second securing members may be removed from their respective slits).

As described above, filter cartridge 220 is removably mounted to manifold 210 by electromagnet features that facilitate mounting and removal of filter cartridge 220 from manifold 210. Notably, for the example embodiment above, a user need not rotate or twist filter cartridge 220 to mount or remove filter cartridge 220 to or from manifold 210. Further, a user need not forcibly remove filter cartridge 220 from manifold 210; rather, a user may use activation mechanism 320 and its circuitry to readily remove filter cartridge 220 from manifold 210.

One exemplary manner in which a filter cartridge may be mounted to a manifold will now be described. With reference now to FIGS. 6 through 10 and 12, First, neck 260 of filter cartridge 220 and sleeve 240 are aligned with main chamber 211 (FIG. 6), first securing member 272 of filter cartridge 220 is aligned with first slit 284, and second securing member 274 of filter cartridge 220 is aligned with second slit 294. Once these various components are aligned, filter cartridge 220 is moved upward, denoted as arrow U in FIG. 11, toward manifold 210 along the axial direction A. When filter cartridge 220 is mounted to manifold 210, neck 260 of filter cartridge 220 and sleeve 240 are received within main chamber 211 of manifold 210 (FIG. 6), first securing member 272 is received within first slit 284 (FIGS. 8 and 10), and second securing member 274 is received within second slit 294.

In some embodiments, the magnetic attraction between first magnet 300 and first magnetic plunger 330 is such that first magnetic plunger 330 is biased toward the first position absent a counteracting magnetic field driving first magnetic plunger 330 to the second position. Accordingly, in such embodiments, to allow for insertion of first securing member 272 into first slit 284, first magnetic plunger 330 is moved to the second position by directing electric current through first conducting coil 302 to induce a magnetic field to move first magnetic plunger 330 from the first position to the second position. Thereafter, to mount filter cartridge 220 to manifold 210, first securing member 272 is inserted into first slit 284. Once inserted first securing member 272 is inserted into first slit 284, the flow of electrical current through first conducting coil 302 is ceased so that first magnet 300 may magnetize and attract first magnetic plunger 330 to move first magnetic plunger 330 to the first position. When first magnetic plunger 330 is moved from the second position to the first position, first magnetic plunger 330 is received by first opening 271 defined by first securing member 272. Accordingly, filter cartridge 220 is secured to manifold 210. In some embodiments, the magnetic attraction between second magnet 310 and second magnetic plunger 340 is such that second magnetic plunger 340 is biased toward the first position absent a counteracting magnetic field driving second magnetic plunger 340 to the second position. Accordingly, in such embodiments, to allow for insertion of second securing member 274 into second slit 294, second magnetic plunger 340 may be moved to the second position in the same manner as noted above for moving first magnetic plunger 330 to the second position.

In yet other embodiments, the magnetic attraction between first magnet 300 and first magnetic plunger 330 is such that first magnetic plunger 330 is not moved or biased toward the first position when first magnetic plunger 330 is in the second position. For instance, as shown in FIG. 10, when first magnetic plunger 330 is in the second position, the magnetic attraction between first magnetic plunger 330 and first magnet 300 is not sufficiently strong to move first magnetic plunger 330 from the second position to the first position. Accordingly, in such embodiments, first securing member 272 may simply be inserted into first slit 284. Once first securing member is inserted into first slit 284, first magnetic member 330 is moved to the first position by directing electric current through first conducting coil 302 to induce a magnetic field to move first magnetic plunger 330 from the second position (FIG. 10) to the first position (FIG. 8). As will be appreciated, the electrical current is directed through first conducting coil 302 in a direction opposite the way the electrical current is directed through first conducting coil 302 when moving first magnetic plunger 330 from the first position to the second position. When first magnetic member 330 is moved to the first position (FIG. 8), first magnet 300 magnetizes and attracts first magnetic plunger 330 to secure first magnetic plunger 330 in place within first groove 280. Moreover, when first magnetic member 330 is moved to the first position (FIG. 8), first magnetic member 330 is received within or through first opening 271 of first securing member 272. Accordingly, first securing member 272 grasps first magnetic plunger 330, and consequently, filter cartridge 220 is secured to manifold 210. It will be appreciated that second magnetic plunger 340 may be moved about in the same manner as first magnetic member 330 and may facilitate secure attachment of filter cartridge 220 to manifold 210 as noted above.

In addition, before mounting filter cartridge 220 to manifold 210, the water supplied to water filter assembly 200 is preferably shut or turned off if it has not already been done so. Once filter cartridge 220 is mounted to manifold 210, the water supplied to water filter assembly 200 is then turned on so that water filter assembly 200 may filter water. Refrigerator appliance 100 or another appliance for which water filter assembly 200 provides filtering capability may include features that ensure safe mounting of filter cartridge 220 to manifold 210.

FIG. 13 provides a sequence flow chart of one exemplary method for ensuring safe installation of filter cartridge 220 to manifold 210 according to an exemplary embodiment of the present disclosure. As shown, prior to mounting filter cartridge 220 to manifold 210, a user may use input selectors and display of user interface panel 136 to indicate that filter installation is desired. A user may select "Yes" when prompted "Install filter?" on the display of user interface panel 136. To confirm, the user may be prompted with a confirmation prompt "Are you sure?" The user may confirm by once again selecting "Yes." Once a user has communicated a desire to install a filter and confirmed such intent, controller 180 (FIG. 1) controls valve 216 (FIG. 3) to move to a closed position, which effectively shuts off the water flowing to water filter assembly 200. As such, filter cartridge 220 may safely be mounted to manifold 210 (i.e., without pressurized water spilling out). Once the installation is complete, a user may then confirm that filter cartridge 220 is mounted to manifold 210 by selecting "Yes" to the prompt "Filter installed?" Upon confirmation, controller 180 controls valve 216 to an open position such that water may resume flowing into water filter assembly 200 for filtering.

In alternative exemplary embodiments, refrigerator appliance 100 or another appliance for which water filter assembly 200 provides filtering capability may include alternative mechanical features that shut off the water flow to manifold 210 to ensure safe mounting and removal of filter cartridge 220 to manifold 210. In yet other embodiments, manifold 210 may include mechanical features that selectively allow a flow of water to manifold 210, e.g., such as those mechanical features shown in FIGS. 14 and 15 and described in the accompanying text.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A water filter assembly, comprising:
   a manifold defining a groove extending between a first end and a second end, the manifold further defining a slit in communication with the groove;
   a magnet disposed within the groove at the first end;
   a conducting coil disposed within the groove at the second end, the conducting coil in electrical communication with a power supply;
   a magnetic plunger slideably received within the groove and movable between a first position and a second position;
   a filter cartridge removably mounted to the manifold, the filter cartridge comprising a housing that defines a chamber and a securing member projecting from the housing and defining an opening; and
   a filter media disposed within the chamber;
   wherein when the magnetic plunger is in the first position and the filter cartridge is mounted to the manifold, the securing member is received within the slit, the magnetic plunger is received by the opening of the securing member, the conducting coil surrounds at least a portion of the magnetic plunger, and the magnetic plunger is attracted to the magnet.

2. The water filter assembly of claim 1, wherein the magnetic plunger is formed of a ferromagnetic material.

3. The water filter assembly of claim 1, wherein the magnetic plunger has a first wall and an opposing second wall and a top wall and an opposing bottom wall, and wherein the magnetic plunger has a ramped edge extending between the first wall and the bottom wall.

4. The water filter assembly of claim 1, wherein when the magnetic plunger is in the second position, the magnetic plunger is positioned between the second end of the groove and the slit.

5. The water filter assembly of claim 1, wherein the manifold comprises a bottom wall defining an opening of the slit.

6. The water filter assembly of claim 5, wherein the water filter assembly defines an axial direction and wherein the groove extends between the first end and the second end along a direction orthogonal to the axial direction and the slit extends between the opening of the slit and a blind end along the axial direction.

7. The water filter assembly of claim 6, wherein the groove extends along the direction orthogonal to the axial direction between the blind end of the slit and the bottom wall of the manifold along the axial direction.

8. The water filter assembly of claim 1, wherein the groove defined by the manifold is a first groove, the slit is a first slit, the magnet is a first magnet, the conducting coil is a first conducting coil, and the magnetic plunger is a first magnetic plunger, and wherein the manifold defines a second groove extending between a first end and a second end, and wherein the water filter assembly further comprises:
   a second magnet disposed within the second groove at the first end of the second groove;
   a second conducting coil disposed within the second groove at the second end of the second groove, the second conducting coil in electrical communication with the power supply;
   a second magnetic plunger slideably received within the second groove and movable between a first position and a second position; and
   a securing member projecting from the housing and defining an opening;
   wherein when the second magnetic plunger is in the first position and the filter cartridge is mounted to the manifold, the second securing member is received within the second slit, the second magnetic plunger is received by the opening of the second securing member, the second conducting coil surrounds at least a portion of the second magnetic plunger, and the second magnetic plunger is attracted to the second magnet.

9. The water filter assembly of claim 8, wherein the water filter assembly defines an axial direction, and wherein the first securing member has a length extending from the housing along the axial direction and the second securing member has a length extending from the housing along the axial direction.

10. The water filter assembly of claim 8, wherein the water filter assembly defines a radial direction, and wherein the first securing member extends from the housing radially opposite of the second securing member.

11. The water filter assembly of claim 1, further comprising:
   an activation member in electrical communication with the conducting coil and the power supply, wherein when the activation is activated, the power supply is configured to direct an electric current through the conducting coil.

12. A method for removing a filter cartridge from a manifold, the filter cartridge comprising a securing member defining an opening, the manifold defining a groove extending between a first end and a second end and a slit in communication with the groove and configured to receive the securing member, the manifold comprising a magnetic plunger received within the groove and movable between a first position and a second position, the manifold further comprising a magnet disposed at the first end of the groove and a conducting coil disposed between the slit and the second end of the groove, the conducting coil in electrical communication with a power supply, and wherein when the magnetic plunger is in the first position and the filter cartridge is mounted to the manifold, the magnetic plunger is attracted to the magnet and the magnetic plunger is received by the opening of the securing member, the method comprising:
   shutting off a flow of water to the manifold; and
   inducing a magnetic field to move the magnetic plunger from the first position to the second position such that the magnetic plunger is repelled from the magnet and the magnetic plunger is no longer received within the opening of the securing member.

13. The method of claim 12, wherein when the magnetic plunger is moved to the second position, the magnetic plunger is moved between the slit and the second end of the groove.

14. The method of claim 12, wherein when the filter cartridge is mounted to the manifold, the conducting coil surrounds at least a portion of the magnetic plunger, and wherein inducing the magnetic field comprises directing electric current through the conducting coil surrounding at least the portion of the magnetic plunger so that a magnetic polarity of the magnetic plunger is reversed.

15. The method of claim 14, further comprising:
activating an activation mechanism in electrical communication with the power supply such that electric current is directed through the conducting coil surrounding at least the portion of the magnetic plunger to induce the magnetic field.

16. The method of claim 12, wherein after inducing, the method further comprises:
removing the securing member from the slit so that the filter cartridge is removed from the manifold.

17. The method of claim 16, wherein after the securing member is removed from the slit, the magnetic plunger is moved from the second position to the first position.

18. The method of claim 17, wherein after removing the securing member from the slit, the method further comprises:
directing electric current through the conducting coil to induce a magnetic field to move the magnetic plunger from the first position to the second position;
mounting a second filter cartridge to the manifold, wherein mounting the second filter cartridge comprises inserting a securing member of the second filter cartridge into the slit;
ceasing electrical current through the conducting coil so that the magnet attracts the magnetic plunger to move the magnetic plunger to the first position, wherein when the magnetic plunger is moved from the second position to the first position, the magnetic plunger is received by an opening defined by the securing member of the second filter cartridge to secure the second filter cartridge to the manifold.

19. The water filter assembly of claim 1, wherein the slit defined by the manifold extends lengthwise along the axial direction and the groove extends lengthwise along a direction orthogonal to the axial direction.

20. The water filter assembly of claim 1, wherein the slit and the groove defined by the manifold form a t-shaped cross section.

* * * * *